United States Patent
Im et al.

(10) Patent No.: US 9,460,006 B2
(45) Date of Patent: Oct. 4, 2016

(54) NONVOLATILE MEMORY SYSTEM, SYSTEM INCLUDING THE SAME, AND METHOD OF ADAPTIVELY ADJUSTING USER STORAGE REGION IN THE SAME

(71) Applicants: Hyung Jin Im, Hwaseong-Si (KR); Sang Hoon Choi, Seoul (KR); Jeong Uk Kang, Bucheon-Si (KR); Moon Sang Kwon, Seoul (KR)

(72) Inventors: Hyung Jin Im, Hwaseong-Si (KR); Sang Hoon Choi, Seoul (KR); Jeong Uk Kang, Bucheon-Si (KR); Moon Sang Kwon, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 87 days.

(21) Appl. No.: 14/207,717

(22) Filed: Mar. 13, 2014

(65) Prior Publication Data

US 2014/0281173 A1 Sep. 18, 2014

(30) Foreign Application Priority Data

Mar. 15, 2013 (KR) .................. 10-2013-0028311

(51) Int. Cl.
G06F 3/00 (2006.01)
G06F 5/00 (2006.01)
G06F 13/12 (2006.01)
G06F 13/38 (2006.01)
G06F 12/02 (2006.01)
(Continued)

(52) U.S. Cl.
CPC ............. *G06F 12/0246* (2013.01); *G06F 3/06* (2013.01); *G06F 2009/45583* (2013.01); *G06F 2212/7204* (2013.01)

(58) Field of Classification Search
CPC ........... G06F 2009/45583; G06F 9/50; G06F 11/3017; G06F 11/3433
USPC ..................... 710/1, 53, 56, 57, 74
See application file for complete search history.

(56) References Cited

U.S. PATENT DOCUMENTS

| | | | |
|---|---|---|---|
| 7,137,037 B2 | 11/2006 | Kuo et al. | |
| 8,060,687 B2 | 11/2011 | Yuan et al. | |
| 2003/0110329 A1* | 6/2003 | Higaki | G06F 9/4843 710/36 |

(Continued)

FOREIGN PATENT DOCUMENTS

| | | |
|---|---|---|
| KR | 1020040075968 A | 8/2004 |
| KR | 0745163 B1 | 1/2007 |

(Continued)

OTHER PUBLICATIONS

Operating System Support for Dynamic Over-Provisioning of Solid State Drives.pdf (in 27th ACM Symposium on Applied Computing_SAC 2012).

(Continued)

*Primary Examiner* — Idriss N Alrobaye
*Assistant Examiner* — Getente A Yimer
(74) *Attorney, Agent, or Firm* — Volentine & Whitt, PLLC

(57) ABSTRACT

A method is for adaptively adjusting a user storage region in an entire storage region of a nonvolatile memory system. The method includes a host transmitting a user region information request command to the nonvolatile memory system, the nonvolatile memory system transmitting user region information to the host, the host changing the user region information, the host transmitting a user region information setting command to the nonvolatile memory system, and the nonvolatile memory system controlling a size of the user storage region in response to the user region information setting command.

14 Claims, 17 Drawing Sheets

(51) Int. Cl.
*G06F 3/06* (2006.01)
*G06F 9/455* (2006.01)

(56) References Cited

U.S. PATENT DOCUMENTS

| | | | | |
|---|---|---|---|---|
| 2004/0250005 | A1* | 12/2004 | Wu | G06F 1/32 |
| | | | | 710/313 |
| 2005/0102232 | A1* | 5/2005 | Okabayashi | G06Q 30/04 |
| | | | | 705/41 |
| 2009/0006670 | A1* | 1/2009 | Guok | G06F 12/128 |
| | | | | 710/36 |
| 2009/0182919 | A1* | 7/2009 | Chang | G06F 13/4291 |
| | | | | 710/106 |
| 2010/0235594 | A1 | 9/2010 | Heller et al. | |
| 2011/0047437 | A1 | 2/2011 | Flynn | |
| 2011/0087804 | A1* | 4/2011 | Okaue | G06F 1/26 |
| | | | | 710/5 |
| 2012/0117309 | A1 | 5/2012 | Schuette | |
| 2012/0151254 | A1 | 6/2012 | Horn | |
| 2012/0265926 | A1 | 10/2012 | Tal et al. | |
| 2012/0303873 | A1 | 11/2012 | Nguyen et al. | |

FOREIGN PATENT DOCUMENTS

| | | |
|---|---|---|
| KR | 1020100039181 A | 4/2010 |
| KR | 10-1090394 | 12/2011 |

OTHER PUBLICATIONS

Understanding SSD Over-Provisioning.pdf (Flash Memory Summit 2012 Santa Clara, CA).

* cited by examiner

FIG. 5

URI_T1

| Entry | P1 | P2 | URI |
|---|---|---|---|
| ENT1 | Value 1-1 | Value 2-1 | Value 3-1 |
| ENT2 | Value 1-2 | Value 2-2 | Value 3-2 |
| ENT3 | Value 1-3 | Value 2-3 | Value 3-3 |
| ENT4 | Value 1-4 | Value 2-4 | Value 3-4 |
| ENT5 | Value 1-5 | Value 2-5 | Value 3-5 |

FIG. 6

URI_T2

| URI |
|---|
| URI1 |
| URI2 |
| URI3 |
| URI4 |
| URI5 |

FIG. 7

< CASE1 >

| USR | | | | | | NUSR | |
|---|---|---|---|---|---|---|---|
| 0 | 1 | 2 | 3 | 4 | 5 | 24 | 25 |
| 6 | 7 | 8 | 9 | 10 | 11 | 26 | 27 |
| 12 | 13 | 14 | 15 | 16 | 17 | 28 | 29 |
| 18 | 19 | 20 | 21 | 22 | 23 | 30 | 31 |

RR

TABLE1

| LSN | PSN |
|---|---|
| 90 | 4 |
| 91 | 5 |
| ⋮ | ⋮ |

⇓

< CASE2 >

| USR | | | | R1 | | NUSR | |
|---|---|---|---|---|---|---|---|
| 0 | 1 | 2 | 3 | 4 | 5 | 24 | 25 |
| 6 | 7 | 8 | 9 | 10 | 11 | 26 | 27 |
| 12 | 13 | 14 | 15 | 16 | 17 | 28 | 29 |
| 18 | 19 | 20 | 21 | 22 | 23 | 30 | 31 |

R2   RR

TABLE2

| LSN | PSN |
|---|---|
| 90 | 14 |
| 91 | 15 |
| ⋮ | ⋮ |

NONVOLATILE MEMORY SYSTEM, SYSTEM INCLUDING THE SAME, AND METHOD OF ADAPTIVELY ADJUSTING USER STORAGE REGION IN THE SAME

CROSS-REFERENCE TO RELATED APPLICATIONS

A claim of priority under 35 U.S.C. §119(a) is made to Korean Patent Application No. 10-2013-0028311, filed on Mar. 15, 2013, the disclosure of which is hereby incorporated by reference in its entirety.

BACKGROUND

Embodiments of the inventive concept relate to nonvolatile memory systems, and more particularly, embodiments of the inventive concept relate to nonvolatile memory systems for controlling the size of a user storage region therein based on changed user region information, and to methods of adaptively adjusting a user storage region in the nonvolatile memory system.

Flash memory is widely used in a variety of different nonvolatile memory applications. Some examples include universal serial bus (USB) drives, digital cameras, cellular phones, smart phones, tablet personal computers (PCs), memory cards, and solid state drives (SSDs).

Generally, a flash memory device is configured to include a plurality of memory blocks, and each of the blocks includes a plurality of pages. Each page includes a plurality of memory cells, typically connected to a same word line. Each of the memory cells may be implemented as a single-level cell (SLC) which stores a single bit per cell, or a multi-level cell (MLC) which stores two or more bits per cell. A program operation is performed on a page by page basis, while an erase operation is performed on a block by block basis.

The blocks contained in a flash memory device may be designated in advance to define a user storage region of the device that is available to a user to store data and to read data there from, and a nonuser storage region of the device that is unavailable to the user. The size of the user storage region and the size of the nonuser storage region are fixed during fabrication by the manufacturer of the flash memory device.

SUMMARY

According to some embodiments of the inventive concept, there is provided a method of adaptively adjusting a user storage region in an entire storage region of a nonvolatile memory system. The method includes a host transmitting a user region information request command to the nonvolatile memory system, the nonvolatile memory system transmitting user region information to the host, the host changing the user region information, the host transmitting a user region information setting command to the nonvolatile memory system, and the nonvolatile memory system controlling a size of the user storage region in response to the user region information setting command.

The user region information request command and the user region information setting command may be vendor specific commands.

The user region information may be indicative of at least one of a ratio of a capacity of a nonuser storage region to a capacity of the user storage region, a ratio of the capacity of the user storage region to a total storage capacity of the nonvolatile memory system, a ratio of the capacity of the nonuser storage region to the total storage capacity, the capacity of the user storage region, and the capacity of the nonuser storage region.

The method may further include the host updating logical addresses corresponding to a nonuser storage region according to the changed user region information.

The nonvolatile memory system may change an address mapping table according to the changed user region information.

The host changing the user region information may include the host displaying the user region information of the nonvolatile memory system at a user's request, the host receiving a request to change the user region information of the nonvolatile memory system from the user, and the host changing the user region information in response to the user's request.

Alternatively, the host changing the user region information may include the host selecting an entry from a table, which stores a plurality of entries for the user region information with respect to a predetermined management parameter, as the changed user region information. Here, the predetermined management parameter may include sequential read performance, random read performance, sequential write performance, random write performance, maximum latency, lifespan, or data write capacity.

As another alternative, the host changing the user region information may include the host selecting one user region information item from a table, which stores a plurality of predetermined user region information items, as the changed user region information.

The one user region information item may be adaptively selected from the table according to at least one of an access frequency to the nonvolatile memory system, data usage with respect to the nonvolatile memory system, and a data write capacity with respect to the nonvolatile memory system.

The nonvolatile memory system may be a flash-based storage device, such as an embedded MMC (eMMC), a universal flash storage (UFS), or a solid state drive (SSD), including a flash memory controller.

According to other embodiments of the inventive concept, there is provided a nonvolatile memory system including a nonvolatile memory device comprising a user storage region and a nonuser storage region, and an address mapping module configured to transmit user region information to a host in response to a user region information request command received from the host and to control a size of the user storage region according to changed user region information received from the host.

The address mapping module may change an address mapping table according to the changed user region information.

The user region information may include at least one of a ratio of a capacity of a nonuser storage region to a capacity of the user storage region, a ratio of the capacity of the user storage region to a total storage capacity of the nonvolatile memory system, a ratio of the capacity of the nonuser storage region to the total storage capacity, the capacity of the user storage region, and the capacity of the nonuser storage region.

The nonvolatile memory system may be a flash-based storage device, such as an eMMC, a UFS, or an SSD, including a flash memory controller.

According to further embodiments of the inventive concept, there is provided a computing system including a host configured to monitor input/output data of a file server, and a nonvolatile memory system including an entire storage region and to configured to transmit user region information to the host, the user region information indicative of a user storage region contained in the entire storage region. The host is further configured to change the user region information based on at least one of a monitoring result and the user region information, and to transmit corresponding changed user region information to the nonvolatile memory system, and the nonvolatile memory system is further configured to control a size of the user storage region contained in the entire storage region in response to the changed user region information.

The nonvolatile memory system may further include an address mapping module configured to transmit the user region information to a host, and the address mapping module may change an address mapping table according to the changed user region information.

The user region information may indicative of at least one of a ratio of a capacity of a nonuser storage region to a capacity of the user storage region, a ratio of the capacity of the user storage region to a total storage capacity of the nonvolatile memory system, a ratio of the capacity of the nonuser storage region to the total storage capacity, the capacity of the user storage region, and the capacity of the nonuser storage region.

The nonvolatile memory system is a flash-based storage device comprising a flash memory controller, and the nonvolatile memory system is one selected from the group consisting of an embedded MMC (eMMC), a universal flash storage (UFS), and a solid state drive (SSD).

BRIEF DESCRIPTION OF THE DRAWINGS

The above and other aspects and features of the inventive concept will become apparent from the detailed description that follows, with reference to the accompanying drawings, in which:

FIG. 5 is a diagram for reference in describing an example of the operation of the host illustrated in FIG. 1 or 2 when generating the changed user region information according to one or more embodiments of the inventive concept;

FIG. 6 is a diagram for reference in describing an example of the operation of the host illustrated in FIG. 1 or 2 when generating the changed user region information according to one or more other embodiments of the inventive concept;

FIG. 7 is a conceptual diagram for reference in describing an example of the operation of an address mapping module illustrated in FIG. 1 or 2 when changing an address mapping table;

DETAILED DESCRIPTION OF THE EMBODIMENTS

Figure 1:
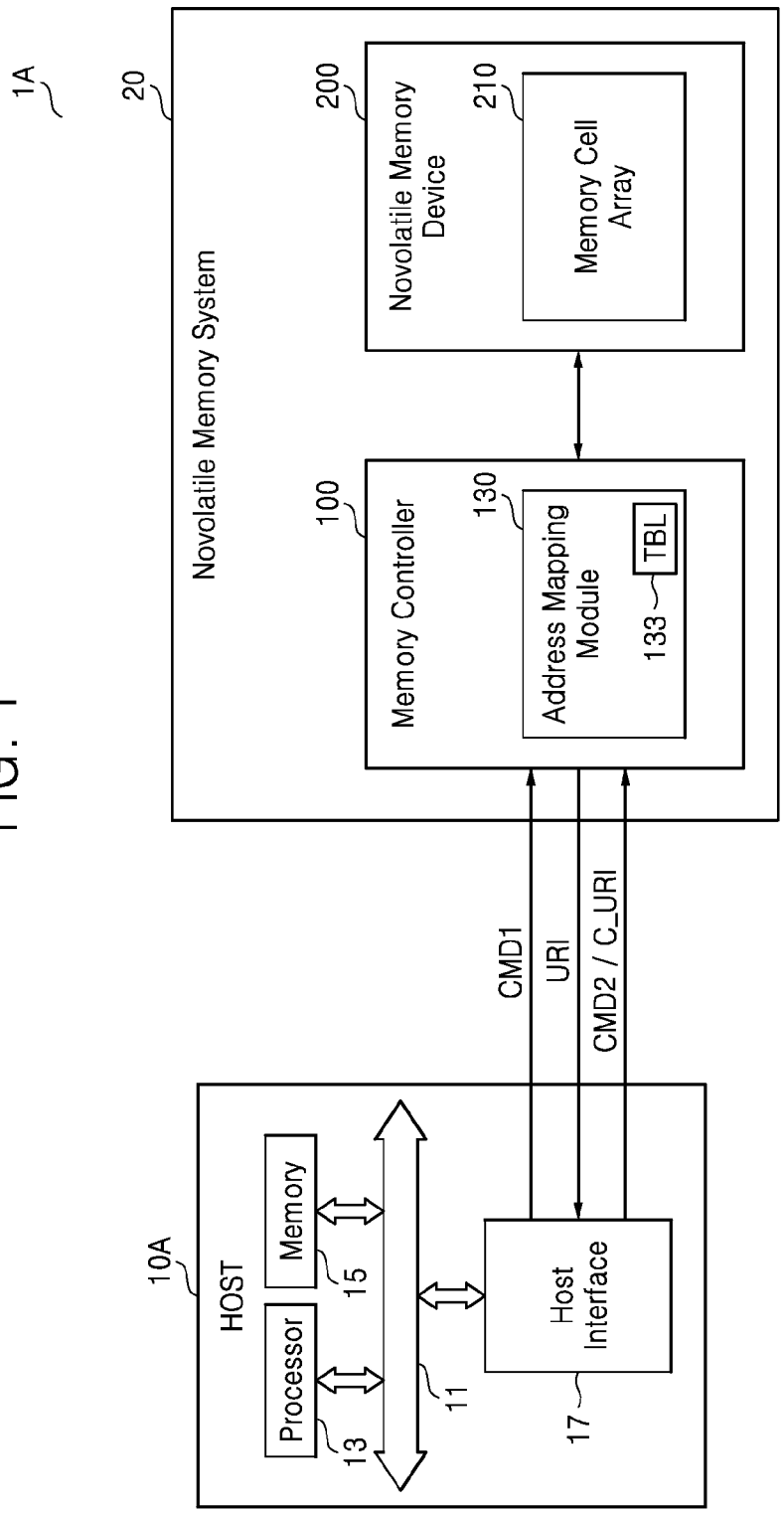
FIG. 1 is a schematic block diagram of an electronic system according to one or more embodiments of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Here, the term "module" will be understood signify hardware, computer program codes for executing particular function and operation, or an electronic recording medium such as a processing circuit equipped with the computer program codes. In other words, the module may indicate the functional and/or structural combination between hardware for embodying the inventive concept and/or software for driving the hardware.

FIG. 1 is a schematic block diagram of an electronic system 1A according to one or more embodiments of the inventive concept. The electronic system 1A may include a host 10A and a nonvolatile memory system 20. The electronic system 1A may adaptively control a user storage region contained in the overall storage region of the nonvolatile memory system 20. The electronic system 1A may, as examples, be implemented as a personal computer (PC), a data server, a network-attached storage (NAS), or a portable electronic device. The portable electronic device may, as examples, be implemented as a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, or an e-book.

In operation, the host 10A may transmit a user region information request command CMD1 to the nonvolatile memory system 20. The nonvolatile memory system 20 may transmit user region information URI to the host 10A in response to the user region information request command CMD1.

The host 10A may change the user region information URI, generate a user region information setting command CMD2 for setting changed user region information C_URI in the nonvolatile memory system 20, and transmit the changed user region information C_URI and the user region information setting command CMD2 to the nonvolatile memory system 20. The operation of the host 10A (or a host 10B in FIG. 2) of generating the changed user region information C_URI will be described later in detail with reference to FIGS. 5 and 6. In other embodiments, the host 10A may transmit the user region information setting command CMD2 containing the changed user region information C_URI to the nonvolatile memory system 20.

The nonvolatile memory system 20 may adjust the size of the user storage region allocated in the entire storage region in response to the user region information setting command CMD2. In other words, the nonvolatile memory system 20 may change the size of the user storage region allocated in the entire storage region using the changed user region information C_URI received from the host 10A.

The host 10A may also update a logic address space, which corresponds to a nonuser storage region, i.e., the entire storage region excluding the user storage region, based on the changed user region information C_URI.

The commands CMD1 and CMD2 may be generated during initialization of the electronic system 1A or may be generated in real time during operation of the electronic system 1A. The commands CMD1 and CMD2 may be vendor specific commands.

Figure 3:
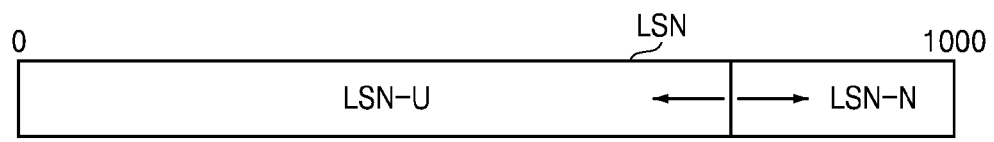
FIG. 3 is a conceptual diagram for reference in describing an example of the operation of a host illustrated in FIG. 1 when updating logic addresses according to changed user region information.

FIG. 3 is a diagram for reference in describing the operation of the host 10A illustrated in FIG. 1 when updating logic addresses according to the changed user region information C_URI. Referring to FIGS. 1 and 3, the host 10A may generate a logical address sequence LSN corresponding to physical addresses of the entire storage region of the nonvolatile memory system 20 to control the entire storage region. The logical address sequence LSN may be linear. The logical address sequence LSN may include logical sector numbers or logical block numbers.

The physical addresses of the user storage region and the nonuser storage region forming the overall storage region of the nonvolatile memory system 20 may be changed based on the changed user region information C_URI. Therefore, the host 10A is required to update the logical address sequence LSN corresponding to the physical addresses changed based on the changed user region information C_URI. Referring to FIG. 3, the host 10A may increase or decrease a logical address sequence LSN-N corresponding to the nonuser storage region based on the changed user region information C_URI.

Referring still to FIG. 1, the host 10A may include a processor 13, a memory 15, and a host interface 17. The host 10A may, as examples, be an application processor or a mobile application processor.

The processor 13 may control the operation of the memory 15 and/or the operation of the host interface 17 through a bus 11. The processor 13 may execute a program, such as an operating system (OS), an application program, or an application programming interface (API), which can perform an operation or function related to a method of adaptively controlling the user storage region in the entire storage region of the nonvolatile memory system 20 according to one or more embodiments of the inventive concept.

The memory 15 may be an operation memory that stores a program related to the method of adaptively controlling the user storage region in the overall storage region of the nonvolatile memory system 20. The memory 15 may be implemented as a volatile memory device or a nonvolatile memory device. As examples, in the case volatile memory, the memory 15 may be implemented using dynamic random access memory (DRAM), static RAM (SRAM), thyristor RAM (T-RAM), zero capacitor RAM (Z-RAM), or twin transistor RAM (TTRAM). As other examples, in the case of nonvolatile memory, the memory 15 may be implemented using electrically erasable programmable read-only memory (EEPROM), flash memory, magnetic RAM (MRAM), spin-transfer torque MRAM (STT-MRAM), conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, molecular electronic memory device, or insulator resistance change memory.

The host interface 17 may exchange signals or data between the host 10A and the nonvolatile memory system 20. The host interface 17 may be equipped with an interface protocol for this purpose. Examples of the interface protocol include a UHS (UHS-I or UHS-II) protocol, a peripheral component interconnect-express (PCI-E) protocol, an advanced technology attachment (ATA) protocol, a serial ATA (SATA) protocol, a parallel ATA (PATA) protocol, or a serial attached SCSI (SAS) protocol. In other embodiments, the interface protocol may be a protocol suitable for a universal serial bus (USB), a multi-media card (MMC), enhanced small disk interface (ESDI), or integrated drive electronics (IDE).

The nonvolatile memory system 20 may include a memory controller 100 and a nonvolatile memory device 200. As examples, the nonvolatile memory system 20 may be an embedded MMC (eMMC), a universal flash storage (UFS), a solid state drive (SSD), or a redundant array of independent disks or redundant array of inexpensive disks (RAID). However, the nonvolatile memory system 20 is not restricted to these particular examples. For instance, the nonvolatile memory system 20 may be any flash-based storage device including a flash memory controller.

The size of a user storage region in the overall storage region of the nonvolatile memory device 200 may be adaptively controlled using the memory controller 100, and more specifically, an address mapping module 130 according to the control of the host 10A. The nonvolatile memory device 200 may be a flash memory device but is not restricted thereto. The nonvolatile memory device 200 may, as other examples, be a PRAM device, an MRAM device, a ReRAM device, or a FeRAM device. In the case where the nonvolatile memory device 200 is the flash memory device, the nonvolatile memory device 200 may be a NAND flash memory device using floating-gate technology or charge trap flash (CTF) technology. Memory cell transistors may be arranged in two or three dimensions in the nonvolatile memory device 200.

Figure 4:
FIG. 4 is a diagram illustrating an example of a memory map corresponding to a nonvolatile memory device illustrated in FIG. 1.
Figure 8:
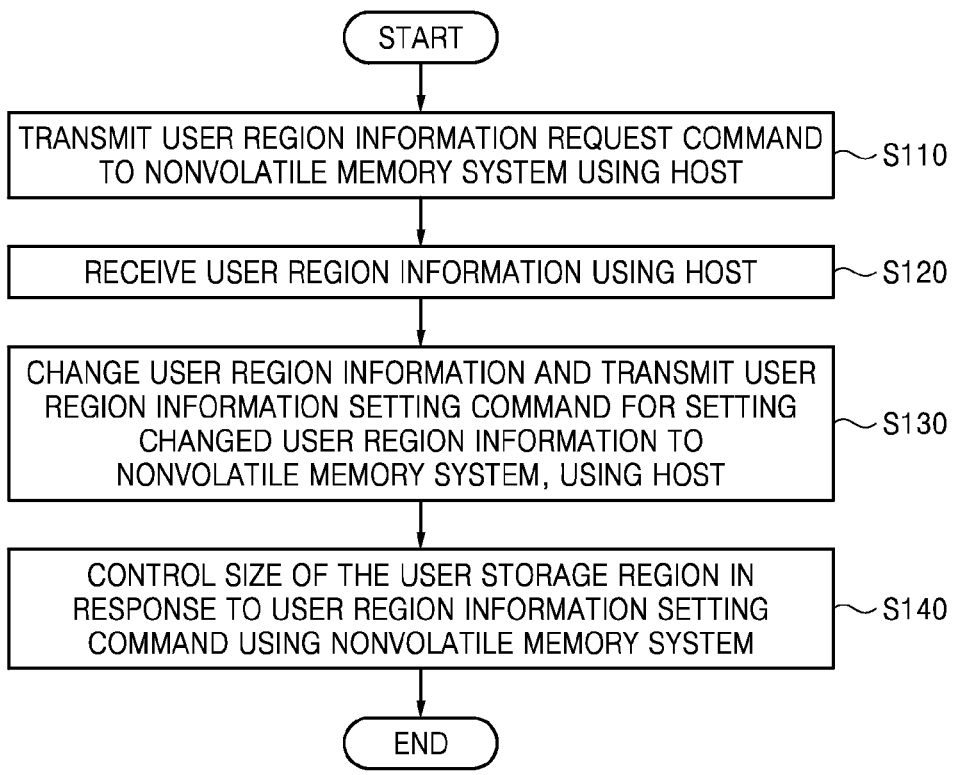
FIGS. 8 through 11 are flowcharts for reference in describing operations of the electronic system illustrated in FIG. 1 or 2.
Figure 9:
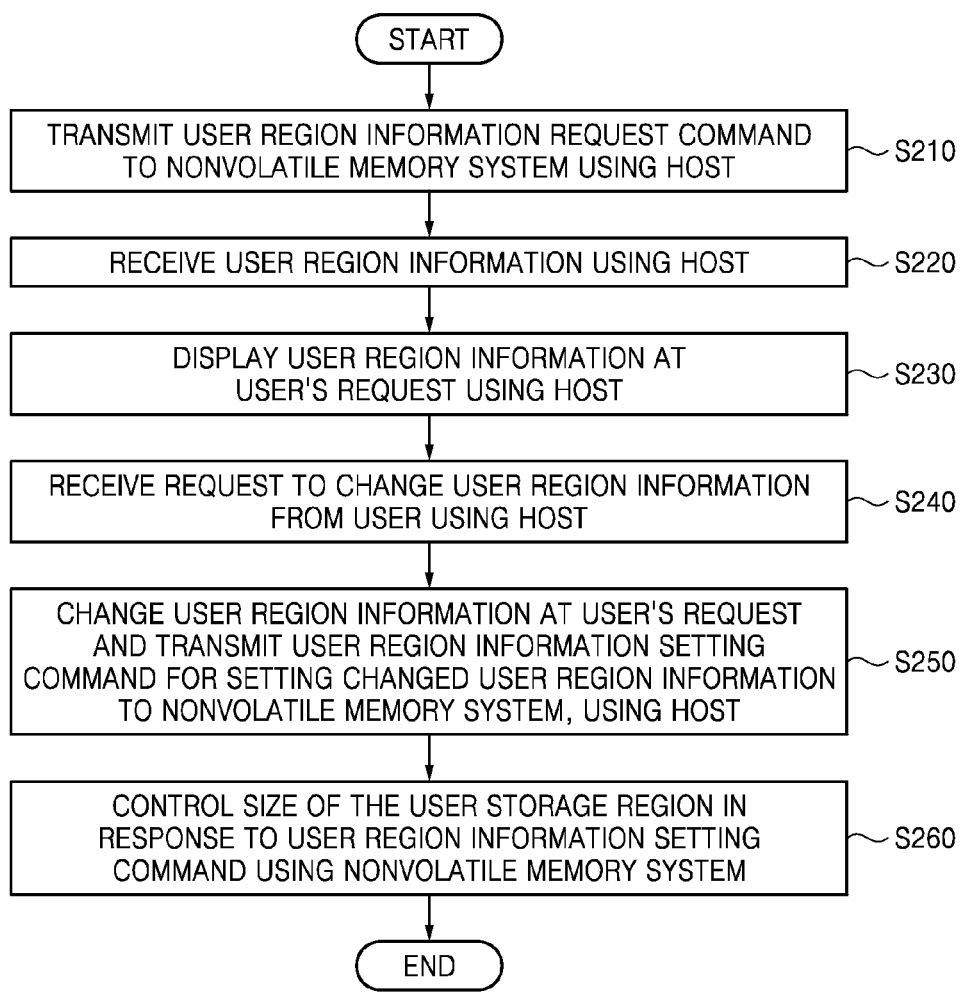
Figure 10:
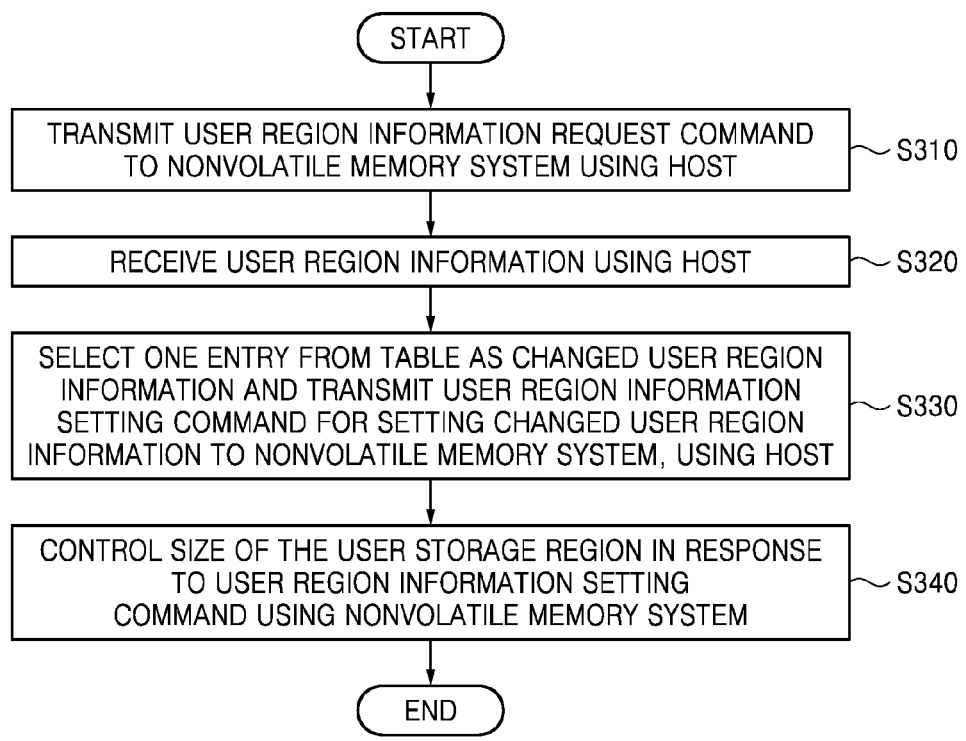
Figure 11:
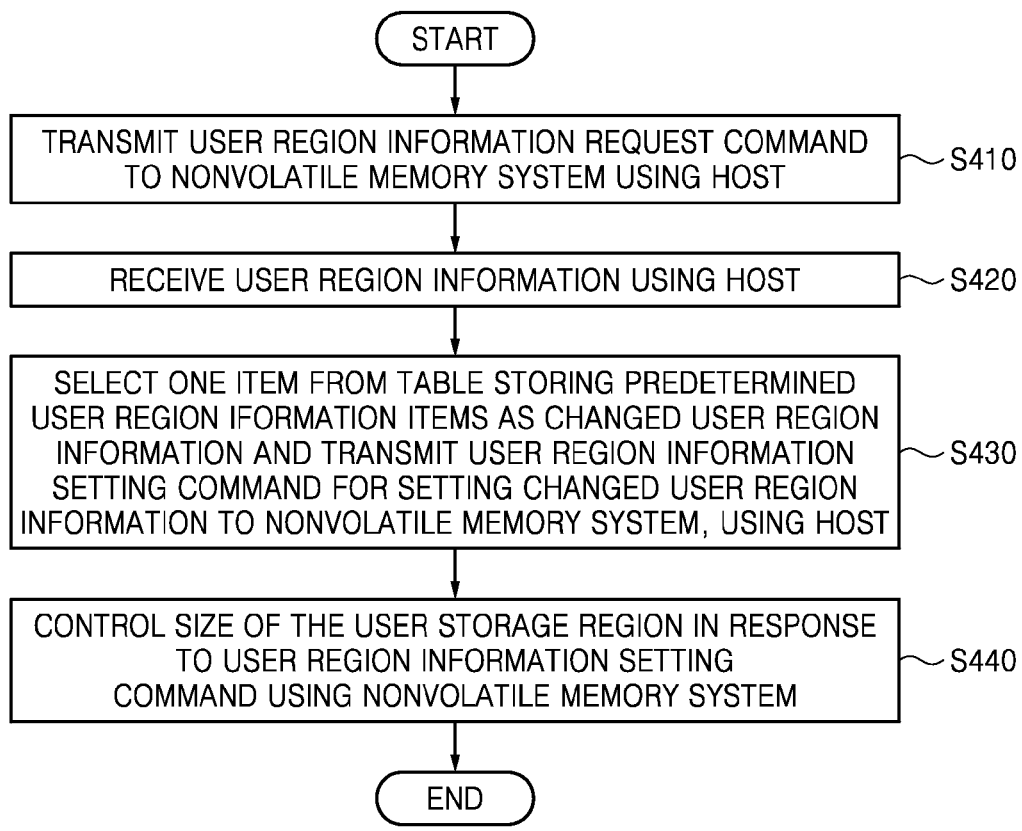

FIG. 4 is a diagram of an example of a memory map corresponding to the nonvolatile memory device 200 illustrated in FIG. 1. Referring to FIGS. 1, 3, and 4, the nonvolatile memory system 20, and more specifically, a memory cell array 210 of the nonvolatile memory device 200 may constitute the entire storage region or space DSR in which data can be stored. Although only one memory cell array 210 is illustrated in FIG. 3, the inventive concept is not limited in this manner, and multiple memory arrays may be provided.

The entire storage region DSR may include a user storage region USR and a nonuser storage region NUSR. The user storage region USR may include a used storage region in which data has already been stored and a programmable free storage region.

Meta information used to manage the nonvolatile memory system 20 and information about the features of the nonvolatile memory device 200 or information about internal operations (e.g., performance control, merging, wear leveling, and garbage collection) necessary for efficient management of the nonvolatile memory device 200 may be stored in the nonuser storage region NUSR. In addition, a signal (e.g., a command or data) output from the host 10A or a signal (e.g., a command or data) input to the host 10A may be temporarily stored in the nonuser storage region NUSR. Also, the nonuser storage region NUSR may include a reserved region that is used to replace blocks having an error (or a fault) in the user storage region USR.

The size of the user storage region USR may be increased or decreased according to the changed user region information C_URI. As the size of the user storage region USR is changed, the size of the nonuser storage region NUSR may be decreased or increased.

The memory controller 100 may control the overall operation of the nonvolatile memory system 20. For instance, the memory controller 100 may control exchange of signals (e.g., commands or data) between the host 10A and the nonvolatile memory system 20. The memory controller 100 may include the address mapping module 130.

The address mapping module 130 may transmit the user region information URI to the host 10A in response to the user region information request command CMD1. The user region information URI may include at least one of a ratio of the capacity of the nonuser storage region NUSR to the capacity of the user storage region USR, a ratio of the capacity of the user storage region USR to the capacity of the entire storage region DSR (or the total capacity of the nonvolatile memory system 20, and more specifically, of the nonvolatile memory device 200), a ratio of the capacity of the nonuser storage region NUSR to the capacity of the entire storage region DSR, the capacity of the user storage region USR, and the capacity of the nonuser storage region NUSR.

The address mapping module 130 may control the size of the user storage region USR in the entire storage region DSR of the nonvolatile memory device 200 based on the changed user region information C_URI received from the host 10A in response to the user region information setting command CMD2. As shown in FIG. 4, the address mapping module 130 may increase or decrease the user storage region USR according to the changed user region information C_URI.

The address mapping module 130 may map logical addresses and physical addresses of the nonvolatile memory device 200, and more particularly, of the memory cell array 210 using an address mapping table 133. The address mapping module 130 may change the address mapping table 133 according to the changed user region information C_URI. The operation of the address mapping module 130 controlling the size of the user storage region USR and changing the address mapping table 133 according to the changed user region information C_URI will be described in detail with reference to FIG. 7.

Here, as discussed previously, the term "module" signifies hardware that can execute the function and the operation corresponding to a name herein described, and/or computer program codes for executing particular function and operation, and/or an electronic recording medium such as a processor equipped with the computer program codes. In other words, the module may indicate the functional and/or structural combination between hardware for embodying the inventive concept and/or software for driving the hardware. The module may be referred to as a device.

The address mapping module 130 may be implemented in a flash translation layer (FTL). The FTL may be software (or a software layer) for managing the nonvolatile memory system 20.

Figure 2:
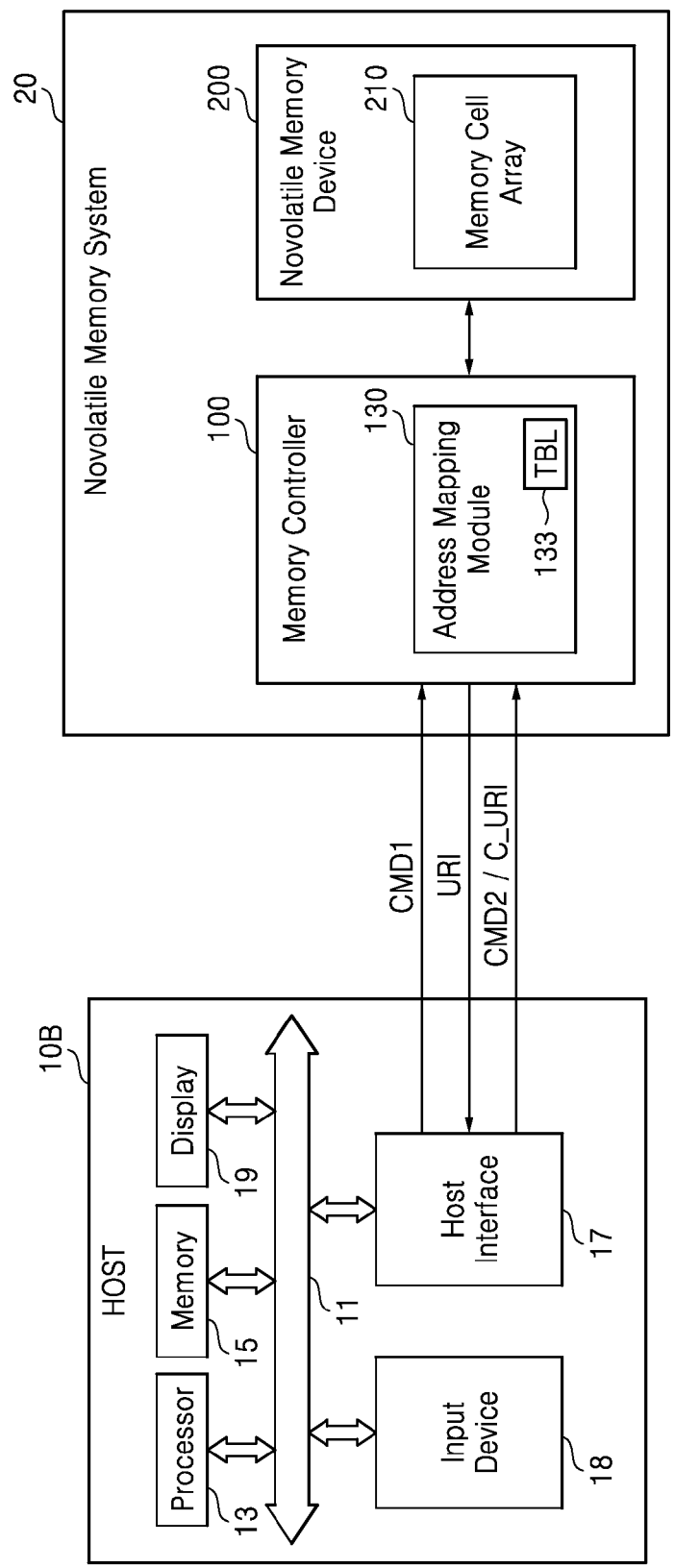
FIG. 2 is a schematic block diagram of an electronic system according to one or more other embodiments of the inventive concept.

FIG. 2 is a schematic block diagram of an electronic system 1B according to other embodiments of the inventive concept. Referring to FIGS. 2 through 4, unlike the host 10A in the electronic system 1A illustrated in FIG. 1, a host 10B in the electronic system 1B may include an input device 18 and a display 19 in addition to the processor 13, the memory 15, and the host interface 17. Although the input device 18 and the display 19 are implemented within the host 10B in the embodiments illustrated in FIG. 2, the inventive concept is not restricted to the current embodiments. They may be implemented outside the host 10B.

The host 10B may transmit the user region information request command CMD1 to the nonvolatile memory system 20. The nonvolatile memory system 20 may transmit the user region information URI to the host 10B in response to the user region information request command CMD1.

The host 10B may display the user region information URI on the display 19 at a user's request received through the input device 18. The host 10B may receive a request to change the user region information URI input by the user through the input device 18, change the user region information URI in response to the user's request, generate the user region information setting command CMD2 for setting the changed user region information C_URI in the nonvolatile memory system 20, and transmit the changed user region information C_URI and the user region information setting command CMD2 to the nonvolatile memory system 20. The host 10B may transmit the user region information setting command CMD2 containing the changed user region information C_URI to the nonvolatile memory system 20.

The nonvolatile memory system 20 may control the size of the user storage region USR in its entire storage region DSR in response to the user region information setting command CMD2. In other words, the nonvolatile memory system 20 may change the size of the user storage region USR in the entire storage region DSR using the changed user region information C_URI received from the host 10B.

The host 10B may also update the logical address sequence LSN-N corresponding to the nonuser storage region NUSR in the entire storage region DSR according to the changed user region information C_URI.

The commands CMD1 and CMD2 may be generated curing the initialization of the electronic system 1B or may be generated in real time during the operation of the electronic system 1B.

The structure and operations of the elements 13, 15, and 17 included in the host 10B illustrated in FIG. 2 may be substantially the same as those of the elements 13, 15, and 17 included in the host 10A illustrated in FIG. 1. Also, the structure and operations of the nonvolatile memory system 20 included in the electronic system 1B illustrated in FIG. 2 may be substantially the same as those of the nonvolatile memory system 20 included in the electronic system 1A illustrated in FIG. 1.

FIG. 5 is a diagram for reference in describing an operational example of the host 10A or 10B generating the changed user region information C_URI according to some embodiments of the inventive concept. Referring to FIGS. 1 through 5, the host 10A or 10B (collectively denoted by reference numeral 10) may change the user region information URI received from the nonvolatile memory system 20 and generate the changed user region information C_URI.

In detail, the host 10 may select, as the changed user region information C_URI, an entry ENT1, ENT2, ENT3, ENT4, or ENT5 from a table URI_T1 that stores a plurality of the entries ENT1 through ENT5 for user region information URI with respect to predetermined management parameters P1 and P2. Data Value3-1 through Value3-5 in the user region information URI in the table URI_T1 may be data (or values) corresponding to one of the ratios described above.

The management parameter P1 or P2 may include sequential read performance, random read performance, sequential write performance, random write performance, maximum latency, lifespan, or data write capacity. The data Value3-1 through Value3-5 in the user region information URI with respect to the management parameter P1 or P2 in the table URI_T1 may be obtained through an experiment.

Consequently, the host 10 may control the nonvolatile memory system 20 to change the size of the user storage region USR according to the changed user region information C_URI, thereby inhibiting a decrease in performance and durability of the nonvolatile memory system 20.

Figure 6:
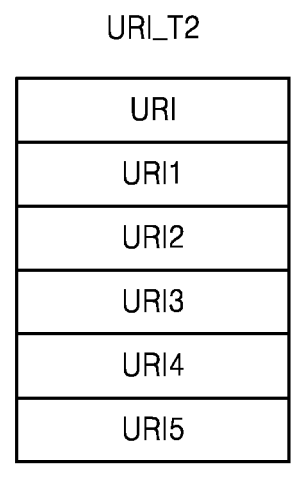

FIG. 6 is a diagram for reference in describing an operational example of the host 10 illustrated in FIG. 1 or 2 when generating the changed user region information C_URI according to other embodiments of the inventive concept. Referring to FIGS. 1 through 4 and FIG. 6, the host 10 may change the user region information URI received from the nonvolatile memory system 20 and generate the changed user region information C_URI.

In detail, the host 10 may select, as the changed user region information C_URI, a user region information item URI1, URI2, URI3, URI4, or URI5 from a table URI_T2 that stores a plurality of the user region information items URI1 through URI5. The user region information items URI1 through URI5 may include data (or values) corresponding to one of the ratios described above or may be data (or values) randomly set for one of the ratios.

The host 10 may adaptively select one of the user region information items URI1 through URI5 in the table URI_T2 as the changed user region information C_URI according to at least one of an access frequency, data usage and data write capacity with respect to the nonvolatile memory system 20. Consequently, the host 10 may control the nonvolatile memory system 20 to change the size of the user storage region USR according to the changed user region information C_URI, thereby inhibiting a degradation in performance and durability of the nonvolatile memory system 20.

FIG. 7 is a diagram for reference in describing an operational example of the address mapping module 130 illustrated in FIG. 1 or 2 changing the address mapping table 133. FIG. 7 shows the operation of the address mapping module 130 decreasing the user storage region USR in the entire storage region DSR according to the changed user region information C_URI, for convenience of description, but the inventive concept is not restricted thereto.

Referring to FIGS. 1 through 7, the address mapping module 130 may decrease the user storage region USR in the entire storage region DSR according to the changed user region information C_URI.

When there is no data stored in a region RR shifted from the user storage region USR to the nonuser storage region NUSR, the address mapping module 130 may map logical addresses based on physical addresses, i.e., 4, 5, 10, 11, 16, 17, 22, and 23 of the region RR in CASE1. At this time, the address mapping table 133 may be changed into TABLE1 shown in FIG. 7 by the address mapping module 130.

When there is data stored in a partial region R1 of the region RR shifted from the user storage region USR to the nonuser storage region NUSR, the address mapping module 130 may allocate a new region R2 having no data stored therein to the region RR and change the address mapping table 133 based on physical addresses, i.e., 14, 15, 20, and 21 of the allocated region R2 in CASE2. The address mapping table 133 may be changed to TABLE2 shown in FIG. 7 by the address mapping module 130.

FIGS. 8 through 11 are flowcharts for reference in describing operational examples of the electronic system 1A or 1B illustrated in FIG. 1 or 2. Referring to FIGS. 1 through 3 and FIG. 8, the host 10A may transmit the user region information request command CMD1 to the nonvolatile memory system 20 in operation S110. The host 10A may receive the user region information URI from the nonvolatile memory system 20 in operation S120.

The host 10A may change the user region information URI and transmit the user region information setting command CMD2 for setting the changed user region information C_URI in the nonvolatile memory system 20 to the nonvolatile memory system 20 in operation S130. The nonvolatile memory system 20 may control the size of the user storage region USR in its entire storage region DSR in response to the user region information setting command CMD2 in operation S140.

Referring to FIGS. 1 through 3 and FIG. 9, the host 10B may transmit the user region information request command CMD1 to the nonvolatile memory system 20 in operation S210. The host 10B may receive the user region information URI from the nonvolatile memory system 20 in operation S220.

The host 10B may display the user region information URI on the display 19 at a user's request input through the input device 18 in operation S230. The host 10B may receive a request to change the user region information URI from the user through the input device 18 in operation S240.

The host 10B may change the user region information URI at the user's request and transmit the user region information setting command CMD2 for setting the changed user region information C_URI in the nonvolatile memory system 20 to the nonvolatile memory system 20 in operation S250. The nonvolatile memory system 20 may control the size of the user storage region USR in its entire storage region DSR in response to the user region information setting command CMD2 in operation S260.

Referring to FIGS. 1 through 3 and FIGS. 5 and 10, the host 10A may transmit the user region information request command CMD1 to the nonvolatile memory system 20 in operation S310. The host 10A may receive the user region information URI from the nonvolatile memory system 20 in operation S320.

The host 10A may select one entry ENT1, ENT2, ENT3, ENT4, or ENT5 from the table URI_T1 as the changed user region information C_URI and transmit the user region information setting command CMD2 for setting the changed user region information C_URI in the nonvolatile memory system 20 to the nonvolatile memory system 20 in operation S330. The nonvolatile memory system 20 may control the size of the user storage region USR in its entire storage region DSR in response to the user region information setting command CMD2 in operation S340.

Referring to FIGS. 1 through 3 and FIGS. 6 and 11, the host 10A may transmit the user region information request command CMD1 to the nonvolatile memory system 20 in operation S410. The host 10A may receive the user region information URI from the nonvolatile memory system 20 in operation S420.

The host 10A may select one item URI1, URI2, URI3, URI4, or URI5 from the table URI_T2 storing a plurality of the predetermined user region information items URI1 through URI5 as the changed user region information C_URI, and transmit the user region information setting command CMD2 for setting the changed user region information C_URI in the nonvolatile memory system 20 to the nonvolatile memory system 20 in operation S430. The nonvolatile memory system 20 may control the size of the user storage region USR in its entire storage region DSR in response to the user region information setting command CMD2 in operation S440.

Figure 12:
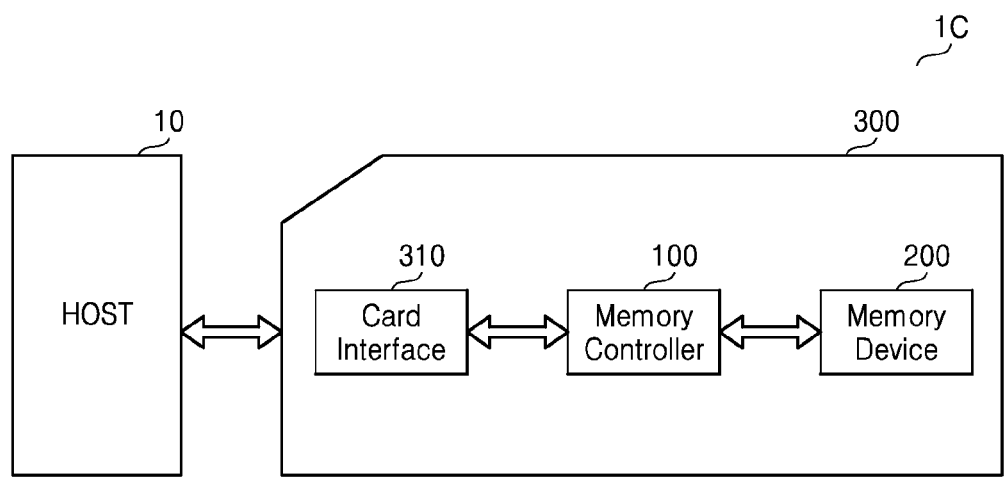
FIG. 12 is a block diagram of an electronic system according to other embodiments of the inventive concept.

FIG. 12 is a block diagram of an electronic system 1C according to other embodiments of the inventive concept. Referring to FIG. 12, the electronic system 1C may include the host 10 and a memory card 300. The memory card 300 may be a smart card. The memory card 300 may include a card interface 310 communicating with the host 10, the nonvolatile memory device 200, and the memory controller 100 controlling the data communication between the card interface 310 and the nonvolatile memory device 200.

The card interface 310 may be a secure digital (SD) card interface or an MMC interface, but the inventive concept is not restricted to the current embodiments. The card interface 310 may interface the host 10 and the memory controller 100 for data exchange according to a protocol of the host 10.

Alternatively, the card interface 310 may support a USB protocol and an interchip (IC)-USB protocol. Here, the card interface 310 may indicate a hardware supporting a protocol used by the host 10, software installed in the hardware, or a signal transmission mode.

Figure 13:
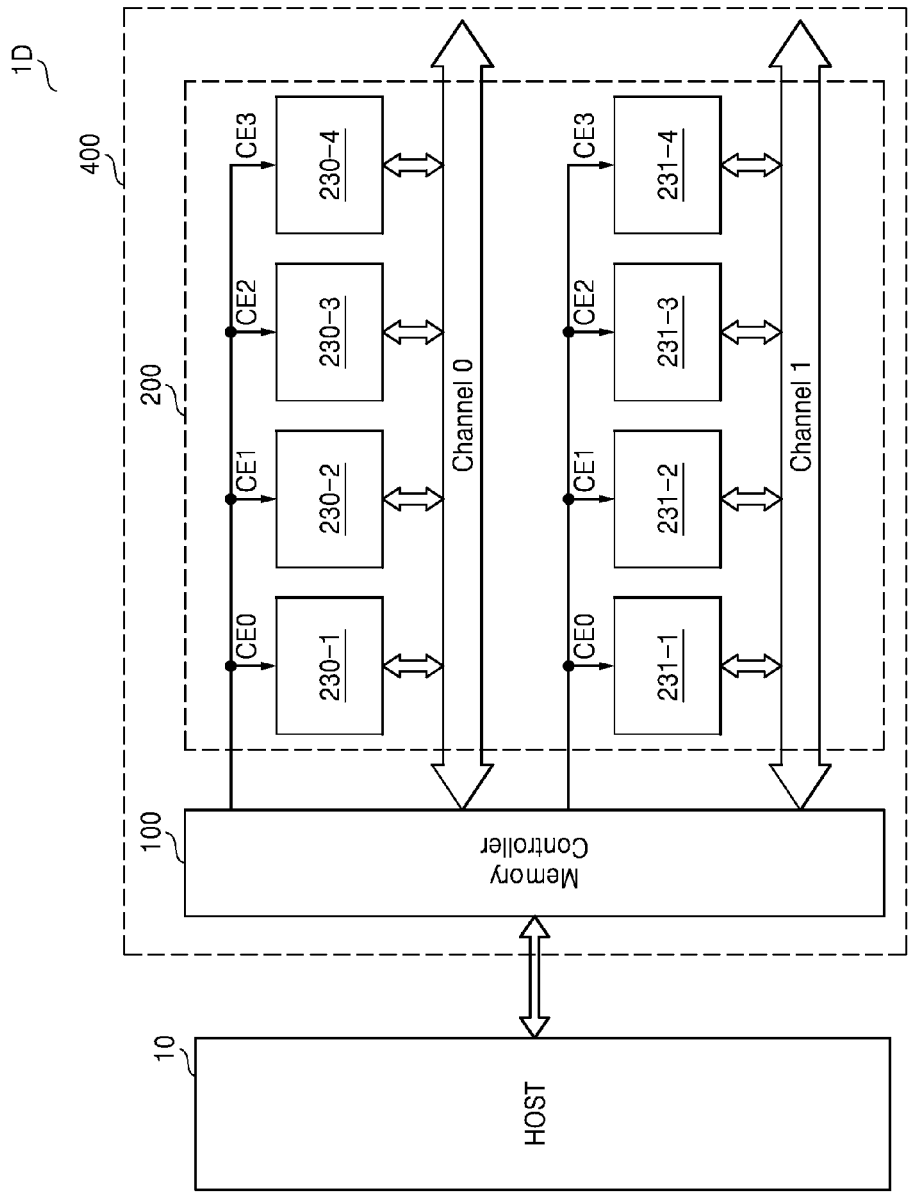
FIG. 13 is a block diagram of an electronic system according to further embodiments of the inventive concept.

FIG. 13 is a block diagram of an electronic system 1D according to further embodiments of the inventive concept. Referring to FIG. 13, the electronic system 1D may include the host 10 and a nonvolatile memory system 400. The nonvolatile memory system 400 may include the memory controller 100 and the nonvolatile memory device 200.

The memory controller 100 may be a NAND flash controller and the nonvolatile memory device 200 may include a plurality of NAND flash memory elements 230-1 through 230-4 and 231-1 through 231-4. Although the nonvolatile memory system 400 having a 2-channel/4-bank hardware structure is illustrated in FIG. 13, the inventive concept is not restricted thereto. The NAND flash memory elements 230-1 through 230-4 and 231-1 through 231-4 may each implemented as a NAND flash chip.

The memory controller 100 is connected with the nonvolatile memory device 200 through two channels CHANNEL0 and CHANNEL1 and each of the channels CHANNEL0 and CHANNEL1 may be connected to four flash memory elements. For instance, the first channel CHANNEL0 may be connected to four NAND flash memory elements 230-1 through 230-4 and the second channel CHANNEL1 may be connected to four NAND flash memory elements 231-1 through 231-4. The NAND flash memory elements 230-1 through 230-4 or 231-1 through 231-4 connected to the same channel may share an input/output (I/O) bus and a control signal. It will be apparent that the number of channels and the number of banks can be changed.

The memory controller 100 may control the channels CHANNEL0 and CHANNEL1 completely independently from each other. In other words, the memory controller 100 may input a write command to two flash chips (e.g., 230-1 and 231-1) at the same time. Accordingly, a write operation is performed on two flash chips 230-1 and 231-1 at the same time, so that the nonvolatile memory system 400 increases the write performance.

Each of the NAND flash memory elements (e.g., 230-1 through 230-4) connected to one channel may be selected using a different CE signal CE0, CE1, CE2, or CE3. The input of a command and data transmission cannot be performed simultaneously with respect to the NAND flash memory elements 230-1 through 230-4 connected to one channel. In other words, a command input time and a data transmission time for each of the NAND flash memory elements 230-1 through 230-4 connected to one channel cannot overlap those for the others of the NAND flash memory elements 230-1 through 230-4, but page program operations of the respective NAND flash memory elements 230-1 through 230-4 connected to one channel may overlap each other.

Figure 14:
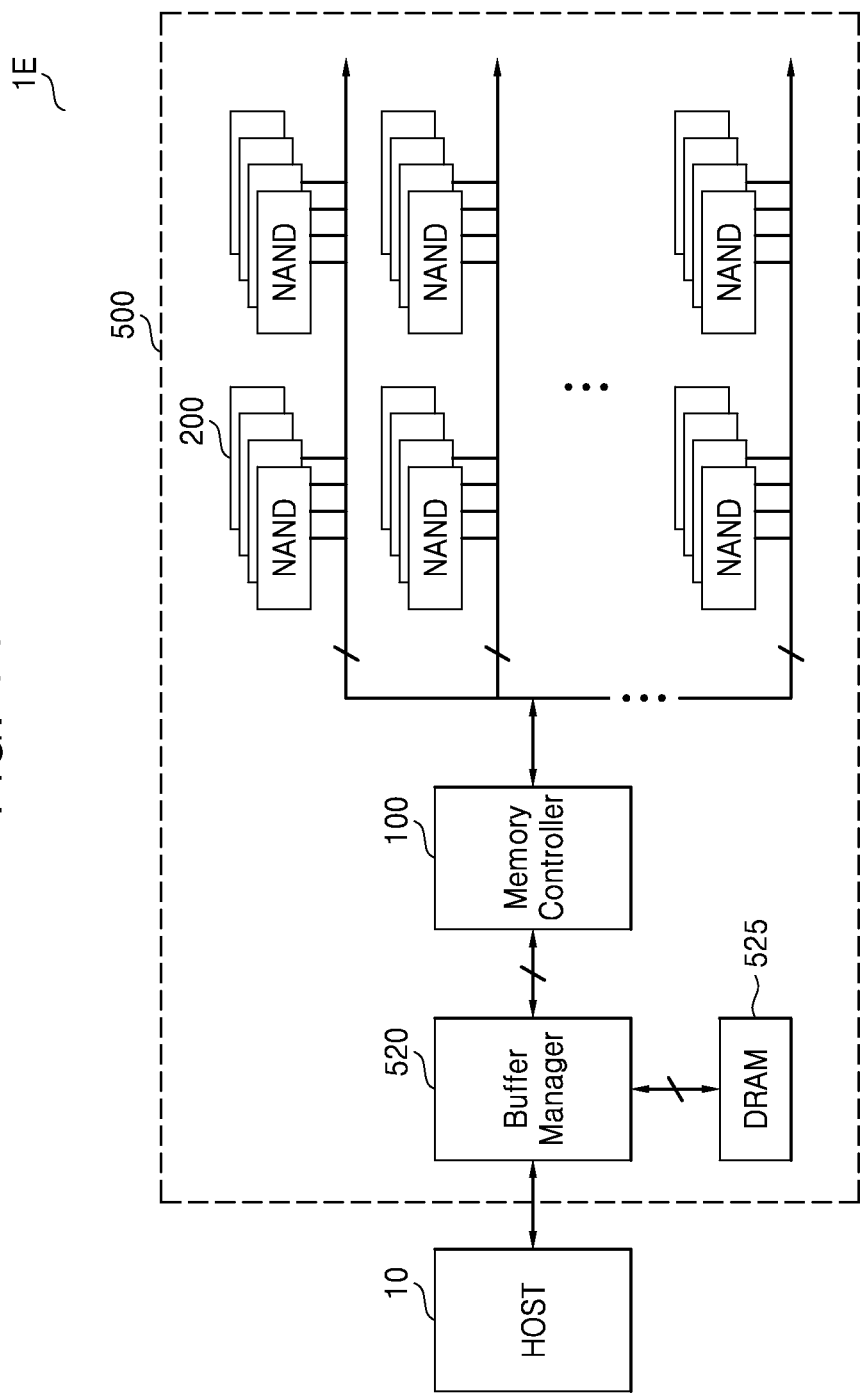
FIG. 14 is a block diagram of an electronic system according to other embodiments of the inventive concept.

FIG. 14 is a block diagram of an electronic system 1E according to other embodiments of the inventive concept. Referring to FIG. 14, the electronic system 1E may include the host 10 and a nonvolatile memory system 500. The nonvolatile memory system 500 may be implemented as a data processing device such as an SSD.

The nonvolatile memory system 500 may include a plurality of memory devices 200, the memory controller 100 controlling the data processing operation of the memory devices 200, a volatile memory device 525 such as DRAM, and a buffer manager 520 controlling data transmitted between the memory controller 100 and the host 10 to be stored in the volatile memory device 525.

Figure 15:
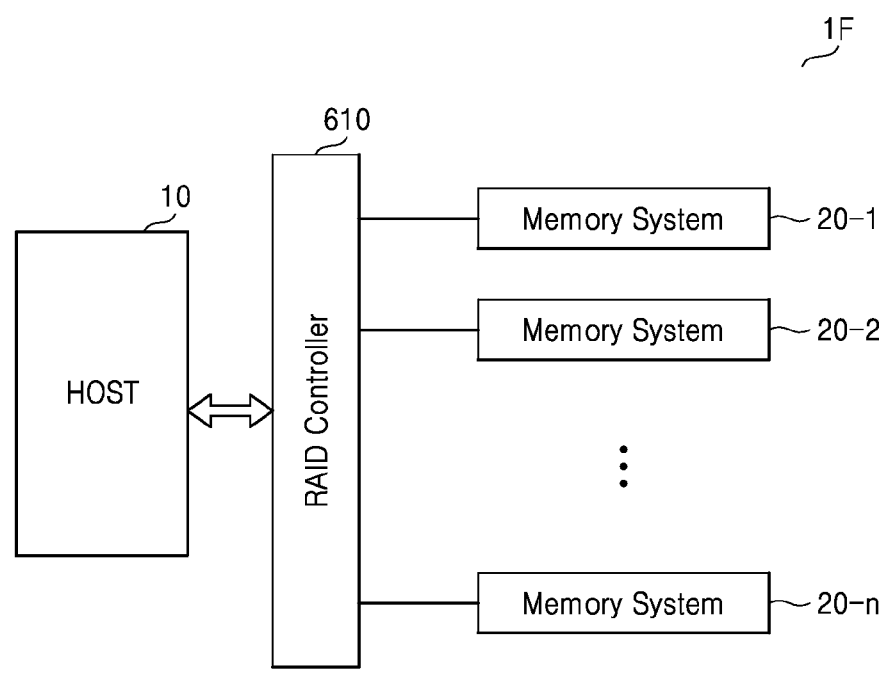
FIG. 15 is a block diagram of an electronic system according to yet other embodiments of the inventive concept.

FIG. 15 is a block diagram of an electronic system 1F according to yet other embodiments of the inventive concept. Referring to FIG. 15, the electronic system 1F may be implemented as a RAID system. The electronic system 1F may include the host 10, a RAID controller 610, and a plurality of memory systems 20-1 through 20-n, where "n" is a natural number.

Each of the memory systems 20-1 through 20-n may be the system 20 illustrated in FIG. 1 or 2. The memory systems 20-1 through 20-n may form a RAID array. The electronic system 1F may be implemented as a PC or an SSD.

During a program operation, the RAID controller 610 may transmit program data output from the host 10 to at least one of the memory systems 20-1 through 20-n according to a RAID level in response to a program command received from the host 10. During a read operation, the RAID controller 610 may transmit to the host 10 data read from at least one of the memory systems 20-1 through 20-n in response to a read command received from the host 10.

Figure 16:
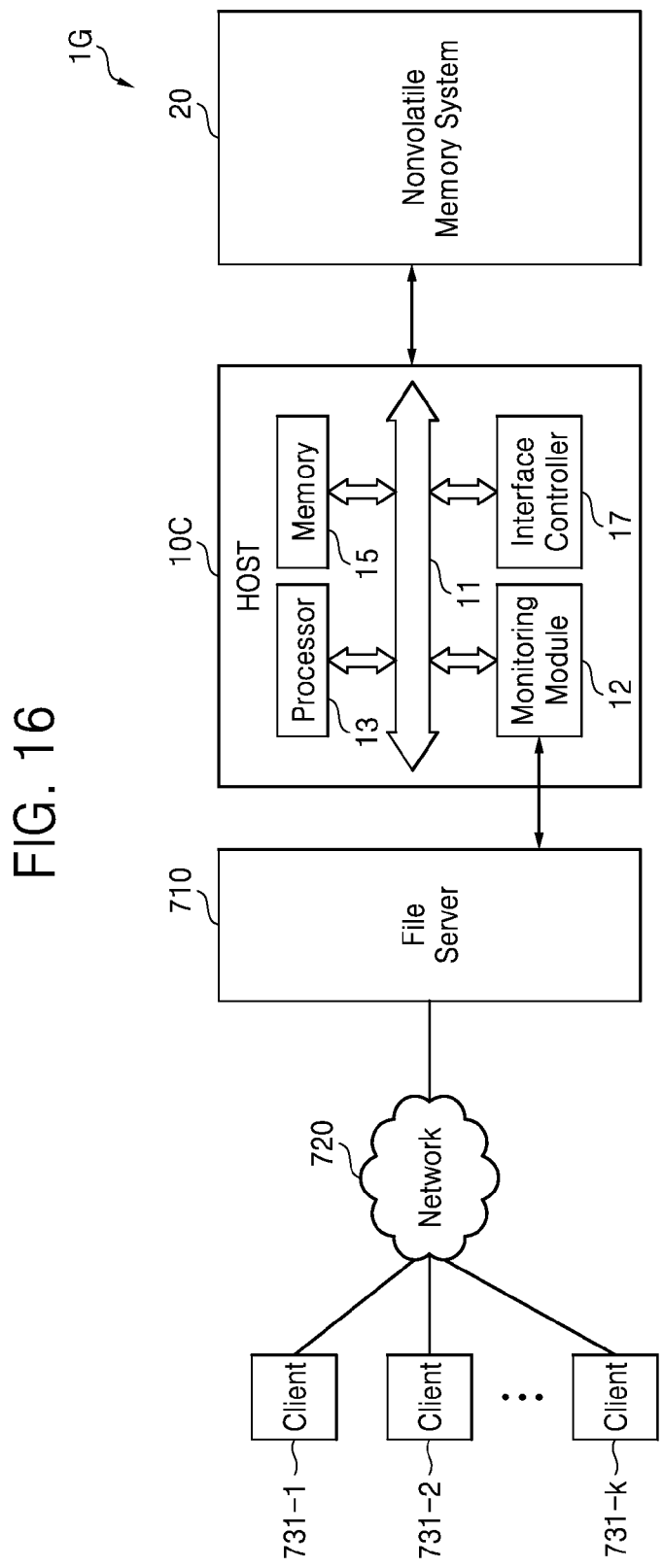
FIG. 16 is a diagram of a computer network according to one or more embodiments of the inventive concept.

FIG. 16 is a diagram of a computer network 1G according to some embodiments of the inventive concept. The computer network 1G may include a host 10C, at least one nonvolatile memory system 20, a file server 710, and a plurality of clients 731-1 through 731-k, where "k" is a natural number.

Except for a monitoring module 12, the function and structure of the host 10C may be substantially the same as those of the host 10A illustrated in FIG. 1. The host 10C may also include the input device 18 and the display 19 illustrated in FIG. 2. At this time, the structure and function of the host 10C may be substantially the same as those of the host 10B illustrated in FIG. 2. The structure and function of the nonvolatile memory system 20 illustrated in FIG. 16 may be substantially the same as those of the nonvolatile memory system 20 illustrated in FIG. 1 or 2.

The file server 710 and the clients 731-1 through 731-k perform data communication through a wired or wireless network 720. The wired or wireless network 720 may be an internet or a mobile communication network. The file server 710 may function as a data source that provides the host 10C with data.

Figure 17:
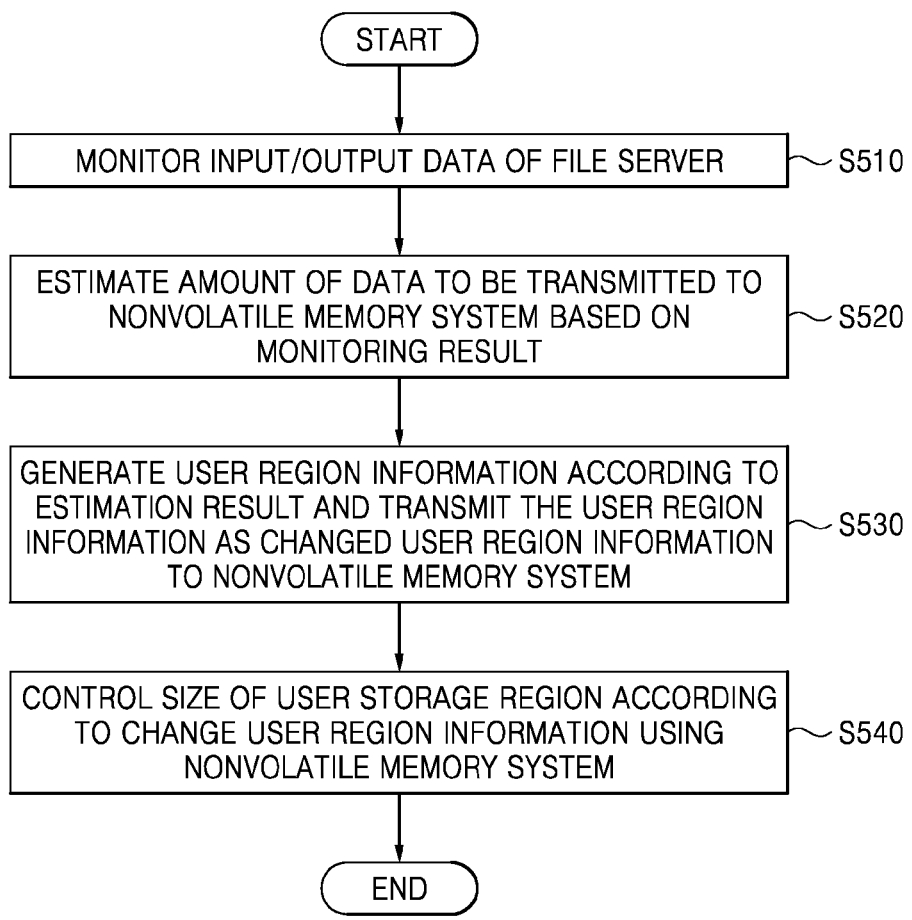
FIG. 17 is a flowchart for reference in describing a method of controlling the size of a user storage region in a nonvolatile memory system using a host included in the computer network illustrated in FIG. 16 according to one or more embodiments of the inventive concept.

FIG. 17 is a flowchart for reference in describing an example of a method of controlling the size of a user storage region in the nonvolatile memory system 20 using the host 10C included in the computer network 1G illustrated in FIG. 16 according to some embodiments of the inventive concept. The monitoring module 12 of the host 10C may monitor the amount of data transmitted between the file server 710 and each of the clients 731-1 through 731-k in operation S510. In addition, the monitoring module 12 of the host 10 may monitor a workload or quality of service (QoS) of the file server 710 in operation S510.

When the monitoring module 12 transmits a monitoring result to the processor 13, the processor 13 may estimate the amount of data to be transmitted to the nonvolatile memory system 20 based on the monitoring result in operation S520. The processor 13 may generate user region information based on an estimation result and transmit the user region information as changed user region information to the nonvolatile memory system 20 in operation S530.

Referring to FIGS. 1 through 17, the host 10C may generate the changed user region information C_URI based on the estimation result and/or the user region information URI. The host 10C may analyze at least one of a pattern of data to be transmitted to the nonvolatile memory system 20, the amount of the data, a start address of the data, and the estimation result, and may generate the changed user region information C_URI based on an analysis result and the user region information URI. The nonvolatile memory system 20 may control the size of the user storage region USR according to the changed user region information C_URI in operation S540.

As described above, according to one or more embodiments of the inventive concept, a host controls the size of a user storage region contained in an entire storage region of a nonvolatile memory system using user region information of the nonvolatile memory system. The nonvolatile memory system changes the size of the user storage region according to changed user region information received from the host, thereby inhibiting deterioration of system performance and durability.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A method of adaptively adjusting a user storage region contained in an entire storage region of a nonvolatile memory system, the method comprising:
   a host transmitting a user region information request command to the nonvolatile memory system;
   the nonvolatile memory system transmitting user region information to the host; the host changing the user region information;
   the host transmitting a user region information setting command to the nonvolatile memory system; and
   the nonvolatile memory system controlling a size of the user storage region, including changing an address mapping table, in response to the user region information setting command, wherein the address mapping table is changed according to the changed user region information, and the user region information is indicative of at least one of a ratio of a capacity of a nonuser storage region to a capacity of the user storage region, a ratio of the capacity of the user storage region to a total storage capacity of the nonvolatile memory system, a ratio of the capacity of the nonuser storage region to the total storage capacity, the capacity of the user storage region, and the capacity of the nonuser storage region.

2. The method of claim 1, wherein the user region information request command and the user region information setting command are vendor specific commands.

3. The method of claim 1, further comprising the host updating logical addresses corresponding to a nonuser storage region according to the changed user region information, the nonuser storage region constituted by the entire storage region excluding the user storage region.

4. The method of claim 1, wherein the host changing the user region information comprises:
   the host displaying the user region information of the nonvolatile memory system at a request of a user;
   the host receiving a request to change the user region information of the nonvolatile memory system from the user; and
   the host changing the user region information in response to the request of the user.

5. The method of claim 1, wherein the host changing the user region information comprises the host selecting an entry from a table, which stores a plurality of entries for the user region information with respect to a predetermined management parameter, as the changed user region information.

6. The method of claim 5, wherein the predetermined management parameter comprises one selected from the group consisting of sequential read performance, random read performance, sequential write performance, random write performance, maximum latency, lifespan, and data write capacity.

7. The method of claim 1, wherein the host changing the user region information comprises the host selecting one user region information item from a table, which stores a plurality of predetermined user region information items, as the changed user region information.

8. The method of claim 7, wherein the one user region information item is adaptively selected from the table according to at least one of an access frequency to the nonvolatile memory system, data usage with respect to the nonvolatile memory system, and data write capacity with respect to the nonvolatile memory system.

9. The method of claim 1, wherein the nonvolatile memory system is a flash-based storage device comprising a flash memory controller, and the nonvolatile memory system is one selected from the group consisting of an embedded MMC (eMMC), a universal flash storage (UFS), and a solid state drive (SSD).

10. A nonvolatile memory system comprising:
a nonvolatile memory device comprising a user storage region and a nonuser storage region; and
an address mapping module configured to transmit user region information to a host in response to a user region information request command received from the host and to control a size of the user storage region according to changed user region information received from the host, and further configured to change an address mapping table according to the changed user region information, wherein the user region information is indicative of at least one of a ratio of a capacity of a nonuser storage region to a capacity of the user storage region, a ratio of the capacity of the user storage region to a total storage capacity of the nonvolatile memory system, a ratio of the capacity of the nonuser storage region to the total storage capacity, the capacity of the user storage region, and the capacity of the nonuser storage region.

11. The nonvolatile memory system of claim 10, wherein the nonvolatile memory system is a flash-based storage device comprising a flash memory controller, and the nonvolatile memory system is one selected from the group consisting of an embedded MMC (eMMC), a universal flash storage (UFS), and a solid state drive (SSD).

12. A computing system comprising:
a host configured to monitor input/output data of a file server; and
a nonvolatile memory system including an entire storage region and configured to transmit user region information to the host, the user region information indicative of a user storage region contained in the entire storage region;
wherein the host is further configured to change the user region information based on at least one of a monitoring result and the user region information, and to transmit corresponding changed user region information to the nonvolatile memory system;
wherein the nonvolatile memory system is further configured to control a size of the user storage region contained in the entire storage region in response to the changed user region information;
wherein the nonvolatile memory system further includes an address mapping module configured to transmit the user region information to a host, and configured to change an address mapping table according to the changed user region information; and
wherein the user region information is indicative of at least one of a ratio of a capacity of a nonuser storage region to a capacity of the user storage region, a ratio of the capacity of the user storage region to a total storage capacity of the nonvolatile memory system, a ratio of the capacity of the nonuser storage region to the total storage capacity, the capacity of the user storage region, and the capacity of the nonuser storage region.

13. The computing system of claim 12, wherein the nonvolatile memory system is responsive to a user region information request command received from the host to transmit the user region information to the host.

14. The computing system of claim 12, wherein the nonvolatile memory system is a flash-based storage device comprising a flash memory controller, and the nonvolatile memory system is one selected from the group consisting of an embedded MMC (eMMC), a universal flash storage (UFS), and a solid state drive (SSD).

* * * * *